United States Patent
Wieres

(12) 
(10) Patent No.: US 6,467,169 B1
(45) Date of Patent: Oct. 22, 2002

(54) PROCESS FOR PRODUCING A HONEYCOMB BODY USING A HARD METAL SHEET AND SEMI-MANUFACTURED HONEYCOMB BODY

(75) Inventor: Ludwig Wieres, Overath (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 09/636,630

(22) Filed: Aug. 11, 2000

Related U.S. Application Data

(63) Continuation of application No. PCT/EP99/00732, filed on Feb. 4, 1999.

(30) Foreign Application Priority Data

Feb. 11, 1998 (DE) .......................... 198 05 563

(51) Int. Cl.[7] .................. B32B 31/02; B32B 3/28; F01N 3/28; B01J 35/04
(52) U.S. Cl. .................. 29/890; 428/593; 502/527.22
(58) Field of Search .................. 428/603, 593, 428/592; 422/180; 502/527.22; 29/890; 72/379.6

(56) References Cited

U.S. PATENT DOCUMENTS

| | | | |
|---|---|---|---|
| 4,247,422 A | * 1/1981 | Davies | 252/465 |
| 4,399,052 A | 8/1983 | Sugino | 252/421 |
| 4,601,999 A | * 7/1986 | Retallick et al. | 502/314 |
| 4,923,109 A | 5/1990 | Cyron | 228/181 |
| 5,219,667 A | 6/1993 | Hampton | 426/593 |
| 5,411,610 A | * 5/1995 | Araki et al. | 148/542 |
| 5,608,968 A | 3/1997 | Maus et al. | 29/890 |
| 5,645,803 A | 7/1997 | Steenackers et al. | 422/177 |
| 6,190,470 B1 | * 2/2001 | Wieres et al. | 148/526 |

FOREIGN PATENT DOCUMENTS

| | | |
|---|---|---|
| DE | 38 25 247 A1 | 2/1989 |
| DE | 44 18 630 A1 | 11/1995 |
| DE | 195 30 850 A1 | 2/1997 |
| DE | 195 30 853 A1 | 2/1997 |
| DE | 195 39 168 A1 | 4/1997 |
| EP | 0 245 738 A1 | 11/1987 |
| EP | 0 658 633 A2 | 6/1995 |
| EP | 0 713 725 A2 | 5/1996 |
| WO | WO-97/12676 | * 4/1997 |

OTHER PUBLICATIONS

Patent Abstracts of Japan No. 01–299645 (Teruhiko), dated Dec. 4, 1989.

"The development and application of a metal supported catalyst for Porsche's 911 Carrera 4" (Pelters et al.), SAE Technical Paper Series, International Congress and Exposition, Detroit, MI, USA. (No date).

* cited by examiner

Primary Examiner—John J. Zimmerman
(74) Attorney, Agent, or Firm—Laurence A. Greenberg; Werner H. Stemer; Ralph E. Locher

(57) ABSTRACT

A process for producing a honeycomb body, in particular for an exhaust gas catalytic converter, includes cold-shaping at least one hard metal sheet for at least partially providing the hard metal sheet with a structure. No soft annealing of the hard metal sheet is effected prior to the cold-shaping. The at least partially structured hard metal sheet is layered and wound or it is merely wound. A semi-manufactured honeycomb body is also provided.

15 Claims, 1 Drawing Sheet

PROCESS FOR PRODUCING A HONEYCOMB BODY USING A HARD METAL SHEET AND SEMI-MANUFACTURED HONEYCOMB BODY

CROSS-REFERENCE TO RELATED APPLICATION

This application is a continuation of copending International Application No. PCT/EP99/00732, filed Feb. 4, 1999, which designated the United States.

BACKGROUND OF THE INVENTION

Field of the Invention

The invention relates in particular to a process for the production of a honeycomb body using a hard metal sheet, especially for exhaust gas catalytic converters. The invention also relates to a semi-manufactured honeycomb body.

It is known for honeycomb bodies to be formed by stacking and/or winding sheet metal layers, at least some of which are structured sheet metal layers. Such honeycomb bodies are used, for example, as support bodies for catalytically active coatings.

In order to produce such a honeycomb body, at least one metal sheet is used, which is at least partially structured. The metal sheet or metal sheet portions is or are stacked and/or wound, in dependence on the structure of the honeycomb body. Different structural configurations of a honeycomb body as a catalytic carrier support body are described, for example, in European Patent Application 0 245 738 A1.

The honeycomb body is then subjected to a brazing material-coating operation. Thereafter the sheet metal layers are brazed together. The operation of brazing the sheet metal layers is implemented in particular in a vacuum brazing furnace.

It is known that honeycomb bodies of that kind are produced from metal sheets which have a thickness of about 110 $\mu$m. It is known for the metal sheet to be subjected to a soft-annealing operation after the cold rolling operation so that a certain degree of elasticity is imparted to the metal sheet. Such elasticity ensures that the metal sheet can be provided with a structure, without the metal sheet suffering damage. The structures involved are in particular corrugation configurations which are formed in the metal sheet by way of suitable corrugating rollers. The fact that the metal sheet has been subjected to a heat treatment operation, the soft-annealing procedures, means that the shaping tools are also not subjected to an excessive loading.

It is also known (from a paper entitled "The Development and Application of a Metal Supported Catalyst for Porsche's 911 Carrera 4" by Stephan Pelters et al., in SAE Technical Paper Series 890488) that metal honeycomb bodies can be made from thin metal sheets or metal foils having a thickness of about 50 $\mu$m. Such metal sheets have also been subjected to a soft-annealing operation.

SUMMARY OF THE INVENTION

It is accordingly an object of the invention to provide a process for producing a honeycomb body using a hard metal sheet and a semi-manufactured honeycomb body, which overcome the hereinafore-mentioned disadvantages of the heretofore-known methods and products of this general type and in which the expenditure involved in the production of the honeycomb body can be reduced, the semi-manufactured honeycomb body is easier to produce and the metal sheet is particularly suitable for the production of a honeycomb body.

With the foregoing and other objects in view there is provided, in accordance with the invention, a process for the production of a honeycomb body, in particular for an exhaust gas catalytic converter, which comprises at least partially producing a structure in at least one hard metal sheet having a thickness of at most 80 $\mu$m by cold-shaping the at least one hard metal sheet without a previous soft-annealing; and layering and winding, or winding, the at least one at least partially structured hard metal sheet.

Surprisingly, it was found that on one hand, the nature of a hard metal sheet having a thickness of at most 80 $\mu$m is such that it permits a cold shaping operation to be implemented to provide a structure without the hard metal sheet being excessively mechanically loaded by the cold shaping operation. On the other hand, it was also found that, when dealing with such a hard metal sheet, during a winding operation, the structure introduced into the hard metal sheet is substantially retained, which was not guaranteed when dealing with soft-annealed sheets having a small thickness. This is a matter of particular importance, especially in regard to the use of honeycomb bodies as exhaust gas catalytic converters. That is because in exhaust catalytic converters the flow passages that the honeycomb body has have a significant influence on the flow characteristics and therewith also on the catalytic performance of the exhaust gas catalytic converter.

The fact that the honeycomb body is formed from a hard metal sheet which is subjected to a cold shaping operation without previous soft-annealing provides that there is also a markedly lower degree of variation in the cell density. That is to be attributed to the fact that the structure of the hard metal sheet is retained in the winding operation, which is not the case when using a metal sheet which was subjected to a soft-annealing treatment prior to the cold shaping operation. A further advantage of the production process according to the invention is that it provides a honeycomb body which enjoys a higher level of brazing quality, after a brazing operation in which the hard metal sheets are joined together. By virtue of the fact that the hard metal sheet has a relatively high strength, the honeycomb body which is disposed in a layered configuration and wound, or merely wound, can be introduced into a tubular casing with a higher degree of prestressing than is the case when using metal sheets having a small thickness, which were subjected to a soft-annealing operation. Higher levels of contact forces between the hard metal sheets can be achieved by virtue of the higher level of prestressing effect. That is also the case even if a smooth metal sheet is introduced between two adjacent hard metal sheets.

It is known that, in order to provide a structure in a metal sheet, the metal sheet is prepared in the form of a winding or coil and the metal sheet is transported from the winding or coil by way of suitable transport rollers to a cold shaping station. In that case, the metal sheet is unwound from the winding or coil. The metal sheet is subjected to a tensile loading during the process of transporting it to and away from the cold shaping station. The process according to the invention for the production of a honeycomb body also achieves a reduction in stretching of the metal sheet when it is transported to and away from the cold shaping station. That is also the case during the operation of winding or coiling up the hard metal sheet.

In accordance with another mode of the invention, a hard metal sheet having a thickness of between 50 $\mu$m and 80 $\mu$m, preferably between about 60 $\mu$m and 80 $\mu$m, is subjected to an at least two-stage cold shaping operation. That alternative mode of implementation of the process provides that the tools for forming a structure which is, for example, a corrugation configuration that is produced in the metal sheet through the use of suitable corrugated rollers, are not exposed to an excessive loading or involve a low level of wear. A multi-stage cold shaping procedure also ensures that the hard metal sheet is not exposed to an excessive loading during the cold shaping operation thereof, so that the hard metal sheet is not damaged or destroyed.

In accordance with a further mode of the invention, a hard metal sheet having a thickness of at most 50 μm, in particular 35 μm, and preferably 20 μm, is subjected at least in part to a cold shaping operation without a previous soft-annealing procedure. The hard metal sheet which has a thickness of at most 50 μm is provided with a structure by the cold shaping operation, in such a way that the structure is formed in a one-stage cold shaping operation. In this case the cold shaping operation is implemented through the use of suitable tools of a tool profile which is also adapted to the thickness of the metal sheet.

In accordance with an added mode of the invention, in order to simplify the production of a honeycomb body which, for example, involves a honeycomb body wound in an S-shape, the hard metal sheet is divided into portions after the cold shaping operation, and the portions are disposed in a layered configuration and wound or coiled.

In accordance with an additional mode of the invention, at least one smooth metal sheet is disposed between two adjacent, at least partially structured metal sheets.

With the objects of the invention in view, there is also provided a semi-manufactured honeycomb body, comprising a tubular casing; and at least one at least partially structured hard metal sheet having a structure formed by cold-shaping without a previous soft-annealing, the at least one hard metal sheet having a thickness of at most 80 μm, and the at least one at least partially structured hard metal sheet layered and wound, or wound, and disposed in the tubular casing.

Such a semi-manufactured honeycomb body is suitable in particular for forming an exhaust gas catalytic converter. That semi-manufactured honeycomb body can be subjected to continuing manufacturing procedures in further production steps. In particular, after a brazing material-coating operation it can be subjected to a brazing procedure. During the brazing procedure soft-annealing of the hard metal sheet can also take place so that possible non-homogeneities of the metal sheet can be eliminated by the actual brazing operation.

A semi-manufactured honeycomb body can be produced more economically by virtue of the fact that the hard metal sheet is subjected to a cold shaping operation without a previous soft-annealing procedure. In particular, the soft-annealing operation which involves a large amount of energy for carrying it into effect is not implemented in regard to the hard metal sheet.

In accordance with another feature of the invention, at least one hard metal sheet has a thickness of between 50 μm and 80 μm, preferably between about 60 μm and 80 μm, and the structure was formed by at least one two-stage cold shaping operation.

In accordance with a further feature of the invention, a hard metal sheet has a thickness of at most 50 μm, in particular 35 μm, and preferably 20 μm, and the cold shaping operation can be effected in a one-stage procedure so that the structure is produced in the hard metal sheet in a single cold shaping step. The hard metal sheet provides a semi-manufactured honeycomb body which has reproducible passage cross-section sizes and shapes since the structure of the hard metal sheet is retained during the production of the semi-manufactured honeycomb body, by virtue of the properties of the material of the hard metal sheet.

In accordance with an added feature of the invention, there is provided at least one smooth metal sheet disposed between two adjacent, at least partially structured metal sheets.

With the objects of the invention in view, there is additionally provided a hard metal sheet for a honeycomb body, the hard metal sheet having a thickness of at most 80 μm, and the hard metal sheet not previously subjected to a soft-annealing treatment.

Such a metal sheet enjoys strength adequate to ensure that when structures are formed in the metal sheet, they are not destroyed when the metal sheet is wound or coiled, for example to form a spiral honeycomb body. The use of the hard metal sheet also provides that, during production of the honeycomb body, no stretching of the hard metal sheet occurs upon transportation thereof to the cold shaping station and in the winding operation. This has the advantage of ensuring that the hard metal sheet was not so severely stretched prior to the cold shaping operation that crack formation within the hard metal sheet would occur due to the cold shaping operation. The avoidance of a stretching effect during an operation of winding the hard metal sheet also affords the advantage of retaining the structure which is produced in the hard metal sheet so that there is a markedly lesser degree of variation in the cell density in the case of a honeycomb body including the hard metal sheet according to the invention. Therefore, the use of the hard metal sheet means that the quality of the honeycomb bodies produced therefrom is consistent. In particular, the use of the hard metal sheet also means that the brazing quality can be improved since higher contact forces can be produced between the structures of the hard metal sheet and a smooth sheet metal layer, due to a suitable prestressing effect, during an introduction of the honeycomb body into a tubular casing.

In accordance with another feature of the invention, the hard metal sheet has a thickness of between 20 μm and 80 μm. In particular it is proposed that a hard metal sheet having a thickness of about 25 μm be used to form a honeycomb body.

With the objects of the invention in view, there is furthermore provided an at least partially structured metal sheet for the formation of a honeycomb body, wherein the metal sheet has a thickness of at most 80 μm. The metal sheet has not been subjected to a soft-annealing treatment.

The structure of the metal sheet can correspond to the structures which are known per se in the case of conventional honeycomb bodies. In particular the structure may involve a corrugation-type structure.

Other features which are considered as characteristic for the invention are set forth in the appended claims.

Although the invention is illustrated and described herein as embodied in a process for producing a honeycomb body using a hard metal sheet and a semi-manufactured honeycomb body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
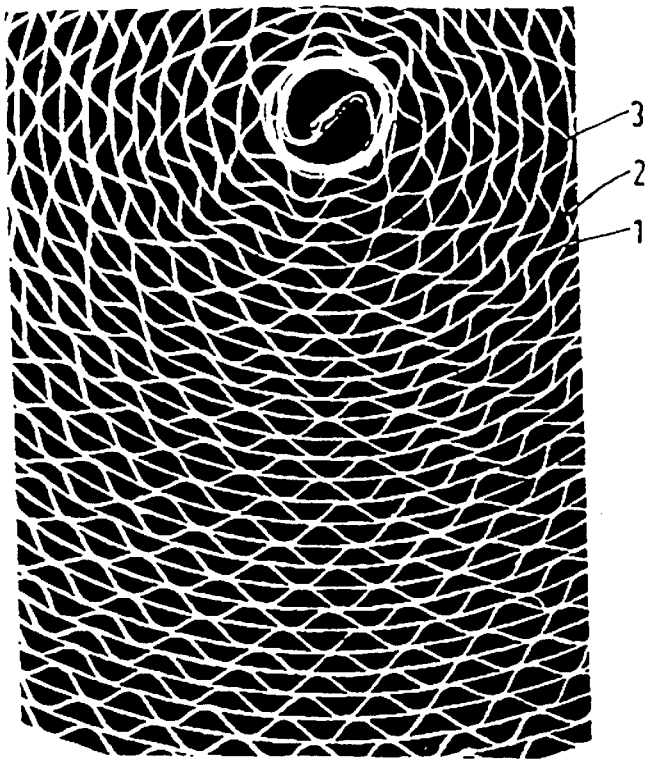
FIG. 1 is a fragmentary, diagrammatic, sectional view of a portion of a honeycomb body which has a spirally wound soft metal sheet.

Referring now to the figures of the drawings in detail and first, particularly, to FIG. 1 thereof, there is seen a portion of a honeycomb body. The honeycomb body is wound in a spiral configuration and includes a corrugated soft metal sheet 1 and a smooth metal sheet 2. The corrugated soft metal sheet 1 and the smooth metal sheet 2 define flow passages 3 which extend substantially in the axial direction of the honeycomb body.

The soft metal sheet 1 has an elastic limit $R_{p0.2}$ which is less than 600 N/mm². It has a tensile strength $R_m$ which is greater than 550 N/mm². The soft sheet metal 1 has an elongation at fracture which is greater than 15%. The Erichsen cupping of the soft metal sheet 1 is greater than 3 mm.

Figure 2:
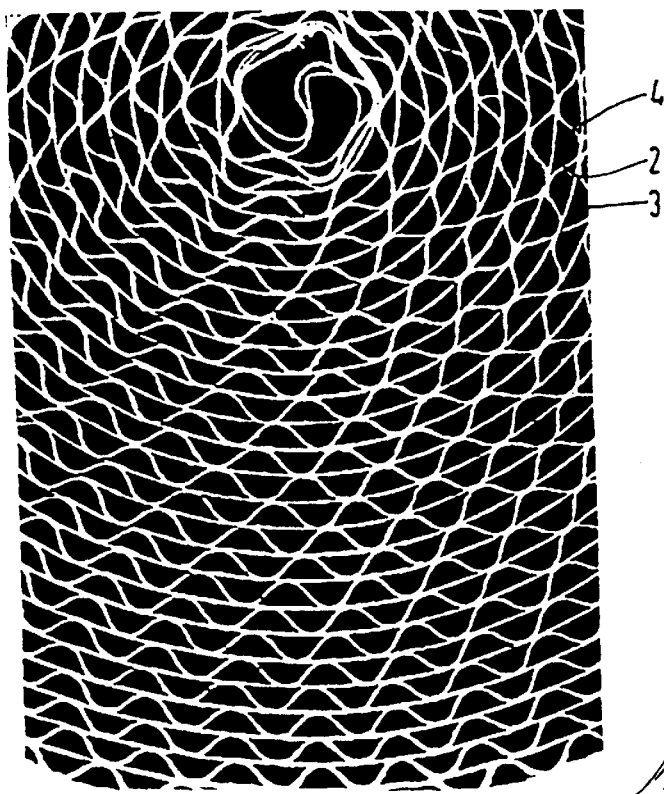
FIG. 2 is a view similar to FIG. 1 of a portion of a honeycomb body which has a spirally wound hard metal sheet.

FIG. 2 shows a portion of a honeycomb body. The honeycomb body is formed by a corrugated hard metal sheet 4 which is wound in a spiral configuration jointly with a smooth metal sheet 2. The smooth metal sheet 2 and the hard metal sheet 4 define passages 3 which extend in the axial direction of the honeycomb body. The at least one at least partially structured hard metal sheet is layered and wound or is merely wound, and is disposed in a tubular casing 5.

The corrugation configuration of the hard metal sheet 4 and the corrugation configuration of the soft metal sheet 1 were produced in the same manner and with tools of the same geometry. Like the soft metal sheet 1, the hard metal sheet 4 was wound in a spiral configuration with the smooth metal sheet 2. A comparison may be made between the cross-sectional geometry of the flow passages 3 in the honeycomb body shown in FIG. 1 and that shown in FIG. 2. It will be clear from that comparison that in particular the spacing of adjacent layers of the smooth metal sheet 2 in the honeycomb body which was produced with a hard metal sheet 4 are greater than the spacings between spaced layers of the smooth metal sheet 2 in the case of the honeycomb body which was produced with a soft metal sheet 1. In other words, during the operation of producing the honeycomb body with a soft metal sheet 1, there was a change in the geometry of the corrugation configuration of the soft metal sheet 1. Such a change in the geometry of the corrugation configuration did not occur in the case of the hard metal sheet 4.

The hard metal sheet 4 has an elastic limit $R_{p0.2}$ which is greater than 950 N/mm². The hard metal sheet 4 has a tensile strength $R_m$ which is between 900 and 1250 N/mm². The elongation at fracture of the hard metal sheet 4 is about 1%. The Erichsen cupping of the hard metal sheet 4 is about 1 mm.

I claim:

1. A process for the production of a honeycomb body for an automobile exhaust gas catalytic converter, which comprises:

at least partially producing a corrugated structure in at least one hard metal sheet having a thickness of at most 80 μm by cold-shaping the at least one hard metal sheet in at least two stages without a previous soft-annealing; and winding the at least one at least partially structured hard metal sheet.

2. The process according to claim 1, wherein at least one hard metal sheet has a thickness of between 50 μm and 80 μm.

3. The process according to claim 1, which further comprises carrying out the cold-shaping step in at least two stages on at least one hard metal sheet having a thickness of between about 60 μm and 80 μm.

4. The process according to claim 1, which further comprises carrying out the cold-shaping step by at least partially cold-shaping at least one hard metal sheet having a thickness of at most 50 μm without a previous soft-annealing.

5. The process according to claim 1, which further comprises carrying out the cold-shaping step by at least partially cold-shaping at least one hard metal sheet having a thickness of at most 35 μm without a previous soft-annealing.

6. The process according to claim 1, which further comprises carrying out the cold-shaping step by at least partially cold-shaping at least one hard metal sheet having a thickness of at most 20 μm without a previous soft-annealing.

7. The process according to claim 1, which further comprises placing at least one smooth metal sheet between two adjacent, at least partially structured hard metal sheets.

8. The process according to claim 1, which further comprises layering the at least one at least partially structured hard metal sheet in addition to the winding step.

9. The process according to claim 8, which further comprises carrying out the cold-shaping step in at least two stages on at least one hard metal sheet having a thickness of between 50 μm and 80 μm.

10. The process according to claim 8, which further comprises carrying out the cold-shaping step in at least two stages on at least one hard metal sheet having a thickness of between about 60 μm and 80 μm.

11. The process according to claim 8, which further comprises carrying out the cold-shaping step by at least partially cold-shaping at least one hard metal sheet having a thickness of at most 50 μm without a previous soft-annealing.

12. The process according to claim 8, which further comprises carrying out the cold-shaping step by at least partially cold-shaping at least one hard metal sheet having a thickness of at most 35 μm without a previous soft-annealing.

13. The process according to claim 8, which further comprises carrying out the cold-shaping step by at least partially cold-shaping at least one hard metal sheet having a thickness of at most 20 μm without a previous soft-annealing.

14. The process according to claim 8, which further comprises dividing the at least one hard metal sheet into portions, and layering and winding the portions.

15. The process according to claim 8, which further comprises placing at least one smooth metal sheet between two adjacent, at least partially structured hard metal sheets.

* * * * *